US012634626B2

(12) United States Patent
Law et al.

(10) Patent No.: US 12,634,626 B2
(45) Date of Patent: May 19, 2026

(54) SMART GLASSES WITH SOUND ENHANCEMENT FUNCTION

(71) Applicant: SOLOS TECHNOLOGY (SHENZHEN) LIMITED, Guangdong (CN)

(72) Inventors: Kwok Wah Law, Guangdong (CN); Wai Kuen Cheung, Guangdong (CN); Chiu Ming So, Guangdong (CN); Chiu Kan Tsang, Guangdong (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 132 days.

(21) Appl. No.: 18/613,166

(22) Filed: Mar. 22, 2024

(65) Prior Publication Data

US 2024/0236557 A1 Jul. 11, 2024

Related U.S. Application Data

(63) Continuation of application No. PCT/CN2022/117700, filed on Sep. 8, 2022.

(30) Foreign Application Priority Data

Sep. 23, 2021 (CN) ......................... 202122293398.0

(51) Int. Cl.

| | |
|---|---|
| ***H04R 1/34*** | (2006.01) |
| ***H04R 1/02*** | (2006.01) |
| ***H04R 1/10*** | (2026.01) |
| ***H04R 1/28*** | (2006.01) |

(52) U.S. Cl.

CPC ............. *H04R 1/345* (2013.01); *H04R 1/028* (2013.01); *H04R 1/1008* (2013.01); *H04R 1/288* (2013.01)

(58) Field of Classification Search

CPC ...... H04R 1/345; H04R 1/028; H04R 1/1008; H04R 1/288; H04R 1/1066; H04R 1/1075; H04R 1/2811; G02C 5/14; G02C 11/00

See application file for complete search history.

(56) References Cited

U.S. PATENT DOCUMENTS

| | | | | |
|---|---|---|---|---|
| 4,882,769 A * | 11/1989 | Gallimore ............ | H04R 1/1066 | 455/344 |
| 4,901,355 A * | 2/1990 | Moore ................ | H04R 1/1066 | 381/381 |
| 5,164,987 A * | 11/1992 | Raven .................. | H04R 1/1066 | 381/381 |

(Continued)

FOREIGN PATENT DOCUMENTS

| | | |
|---|---|---|
| CN | 111736353 A | 10/2020 |
| CN | 113366859 A | 9/2021 |

OTHER PUBLICATIONS

International Search Report and Written opinion of PCT Patent Application No. PCT/CN2022/117700 issued on Nov. 14, 2022 and English translation thereof.

*Primary Examiner* — Oyesola C Ojo

(57) ABSTRACT

Smart glasses with sound enhancement function are provided. The smart glasses have a wearing part and a speaker, the speaker has a sound outlet, and the wearing part is provided with a cover for covering a wearer's ear and the sound outlet together so that the volume of the sound that the wearer can hear can be enhanced.

14 Claims, 10 Drawing Sheets

(56) References Cited

U.S. PATENT DOCUMENTS

| | | | | | |
|---|---|---|---|---|---|
| 5,335,285 | A * | 8/1994 | Gluz | G02C 11/10 381/381 |
| 5,367,345 | A * | 11/1994 | da Silva | G02C 11/10 351/158 |
| 5,579,400 | A * | 11/1996 | Ballein | G02C 11/06 381/385 |
| 5,706,360 | A * | 1/1998 | Khandekar | H04R 1/1008 381/385 |
| 7,278,734 | B2 * | 10/2007 | Jannard | H04M 1/05 351/158 |
| 8,438,659 | B2 * | 5/2013 | Shen | G06F 21/445 726/34 |
| 9,036,854 | B2 * | 5/2015 | Lewis | H04R 5/0335 381/381 |
| 9,467,768 | B2 * | 10/2016 | Besgen, Sr. | A42B 1/245 |
| 9,720,258 | B2 * | 8/2017 | Reyes | G06F 3/01 |
| 10,728,651 | B2 * | 7/2020 | Rusconi Clerici Beltrami | H04R 5/02 |
| 11,526,034 | B1 * | 12/2022 | Pattikonda | G02C 11/10 |
| 11,653,144 | B2 * | 5/2023 | Van Hook | H04R 1/1066 381/381 |
| 11,668,959 | B2 * | 6/2023 | Rusconi Clerici Beltrami | H04R 1/028 381/327 |
| 2007/0248238 | A1 * | 10/2007 | Abreu | G02C 11/10 381/381 |
| 2012/0237075 | A1 * | 9/2012 | East | H04R 17/00 381/381 |
| 2014/0268016 | A1 * | 9/2014 | Chow | H04R 1/028 351/158 |
| 2014/0270316 | A1 * | 9/2014 | Fan | H04R 1/028 381/381 |
| 2017/0366890 | A1 * | 12/2017 | Kulavik | H04R 1/1091 |
| 2021/0240007 | A1 * | 8/2021 | Hicks | H04R 1/08 |

* cited by examiner

SMART GLASSES WITH SOUND ENHANCEMENT FUNCTION

CROSS-REFERENCE TO RELATED APPLICATIONS

The present application is a Continuation Application of PCT Application No. PCT/CN2022/117700, filed on Sep. 8, 2022, which claims the priority of Chinese Patent Application No. 202122293398.0, filed on Sep. 23, 2021, the entire contents of which are hereby incorporated by reference.

TECHNICAL FIELD

The present disclosure relates to the technical field of smart wearable devices, and in particular to smart glasses with sound enhancement function.

DESCRIPTION OF THE PRIOR ART

Smart wearable devices are a general name of wearable devices that are intelligently designed and developed for daily wearable articles, such as watches, wristbands, glasses, clothing, etc. The smart glasses system involves a representative smart wearable device, which has an independent operating system to implement specific functions in addition to the functions of traditional glasses.

For example, the smart glasses system can generally provide the wearer with basic functions such as listening to music, answering and making phone calls through the glasses body. Further, the smart glasses system can detect human head movements through built-in sensors in the glasses body and external smart terminals, so as to provide corresponding voice prompts to the wearer. The medium through which the smart glasses system communicates with the wearer mainly includes a microphone and a speaker. The microphone mainly functions to receive the wearer's voice information, while the speaker mainly functions to output music, conversational speech and other audio to the wearer's ear.

There have been two types of speakers applied in smart glasses systems: bone-conduction and open-ear speakers. The sound outlet of the open-ear speaker is close to but not in contact with the ear. The sound is generally output from the sound outlet and then transmitted to the wearer's ear through the air. However, smart glasses systems using open-ear speakers have two vital problems as follows:

1. The speaker volume that the wearer can actually hear is easily affected by environmental noise. When the environmental noise is very loud, even if the output volume of the smart glasses is adjusted to the maximum, the wearer may not be able to hear clear conversational speech and beautiful music, impacting the user experience.
2. In case of a very quiet environment, the conversational speech or music output by the open-ear speaker may be heard by people next to the wearer, resulting in sound leakage, which not only fails to protect the privacy of the wearer, but also causes unnecessary interference to others.

SUMMARY OF THE DISCLOSURE

The technical problem to be solved by the present disclosure is how to reduce the impact of environmental noise on the volume of the smart glasses speaker that the wearer can hear and sound leakage when the wearer uses the smart glasses.

In order to solve the above technical problem, the present disclosure discloses smart glasses with sound enhancement function, which includes a wearing part and a speaker. The speaker has a sound outlet, and the wearing part is provided with a cover for covering the wearer's ear and the sound outlet together.

The smart glasses according to the present disclosure have a sound enhancement function. Specifically, a cover for covering the wearer's ear is provided on the wearing part of the smart glasses, and after wearing the smart glasses, as the sound outlet of the speaker of the smart glasses is covered in the cover, the cover isolates the sound outlet of the speaker and the wearer's ear from the external environmental noise, changing the "open-ear" speaker into a "closed-ear" speaker, which allows the wearer's ear to receive less external environmental noise, reducing the impact of external environmental noise on the volume of the smart glasses speaker that the wearer can hear, and this "closed-ear" speaker can also reduce sound leakage to a certain extent, protecting the privacy of the wearer while also avoiding unnecessary interference to others.

DESCRIPTION OF EMBODIMENTS

In order to provide a clearer understanding of the objects, technical solutions and advantages of the present disclosure, further detailed descriptions will be provided below with reference to the drawings and embodiments. It should be appreciated that the specific embodiments described here are only used to explain the present disclosure and are not intended to limit the present disclosure.

Figure 1:
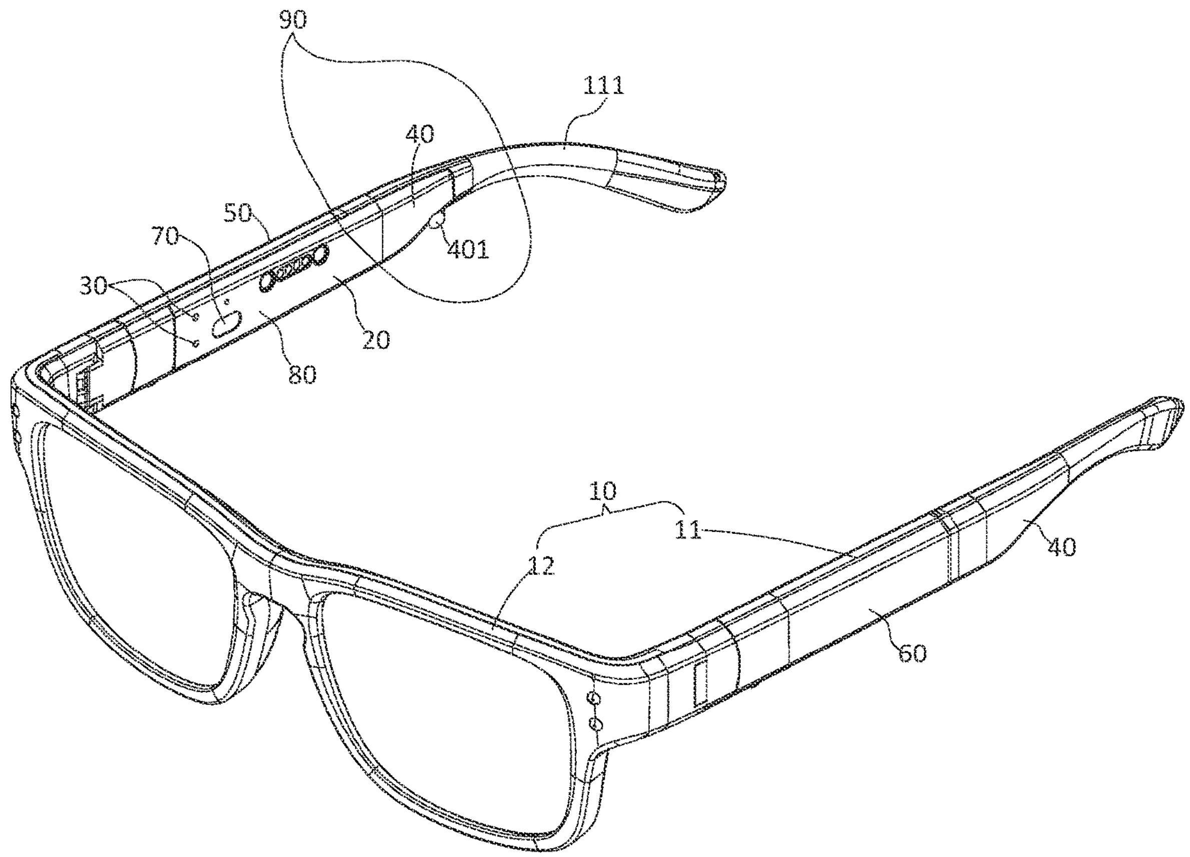
FIG. 1 is a perspective view of smart glasses according to the present disclosure.
Figure 2:
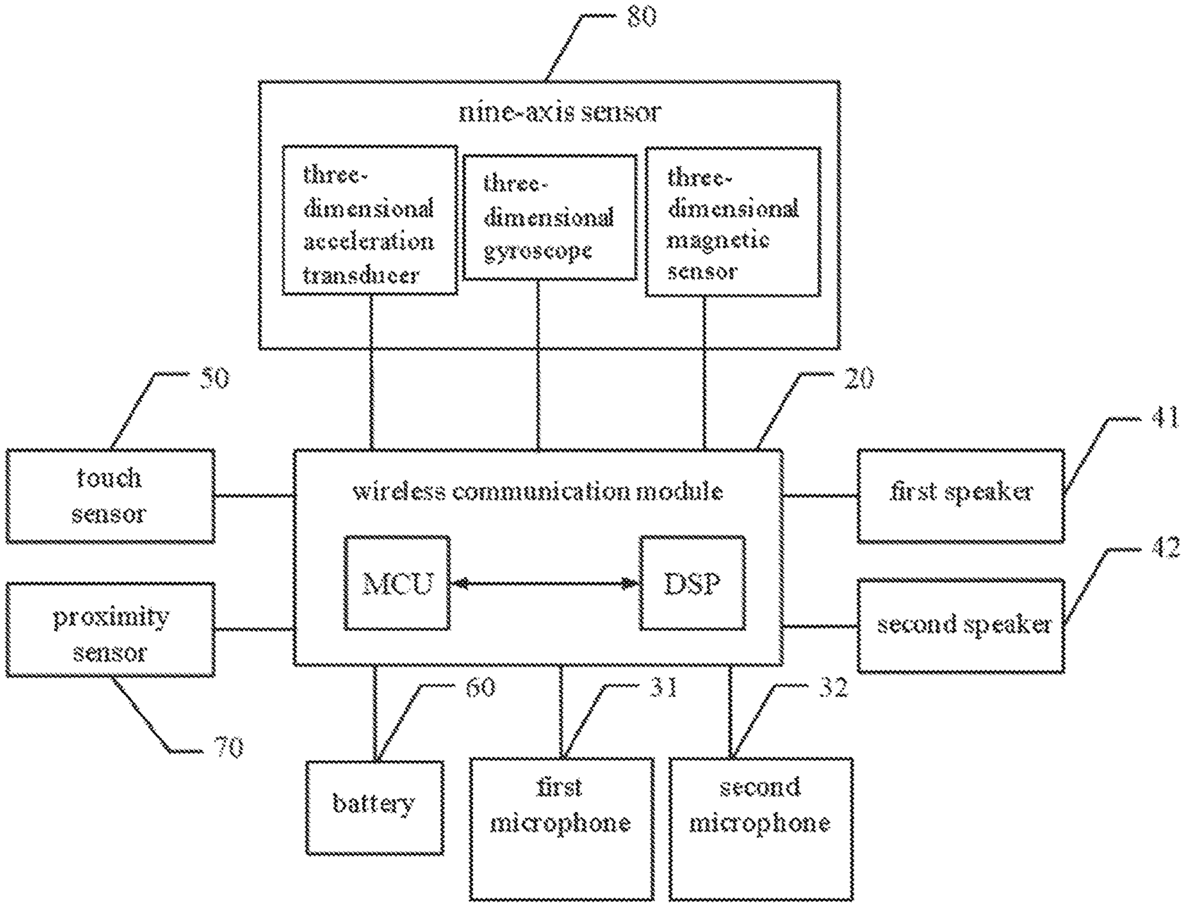
FIG. 2 is a block diagram of internal functional modules of the smart glasses according to the present disclosure.

Referring to FIGS. 1 and 2, the present disclosure provides smart glasses with sound enhancement function, including a glasses body 10 and functional devices built in the glasses body 10. The glasses body 10 mainly includes temples 11 and a front frame 12 with lenses installed therein. The tail end of the temple 11 can be equipped with a tail sleeve 111 as needed. Here, the temple 11 and the tail sleeve 111 are together referred to as the "wearing part".

The above functional devices may include one or more of the following devices: wireless communication module 20, microphone 30, speaker 40, touch sensor 50, battery 60, proximity sensor 70, and nine-axis sensor 80.

The wireless communication module 20 is placed on the inside of the temple 11 of the glasses body 10. The wireless communication module 20 is connected to the microphone 30 and the speaker 40. The wireless communication module 20 has a built-in processing module. The processing module mainly includes: a Micro Control Unit (MCU) and a Digital Signal Processing (DSP) connected to the MCU.

Figure 3:
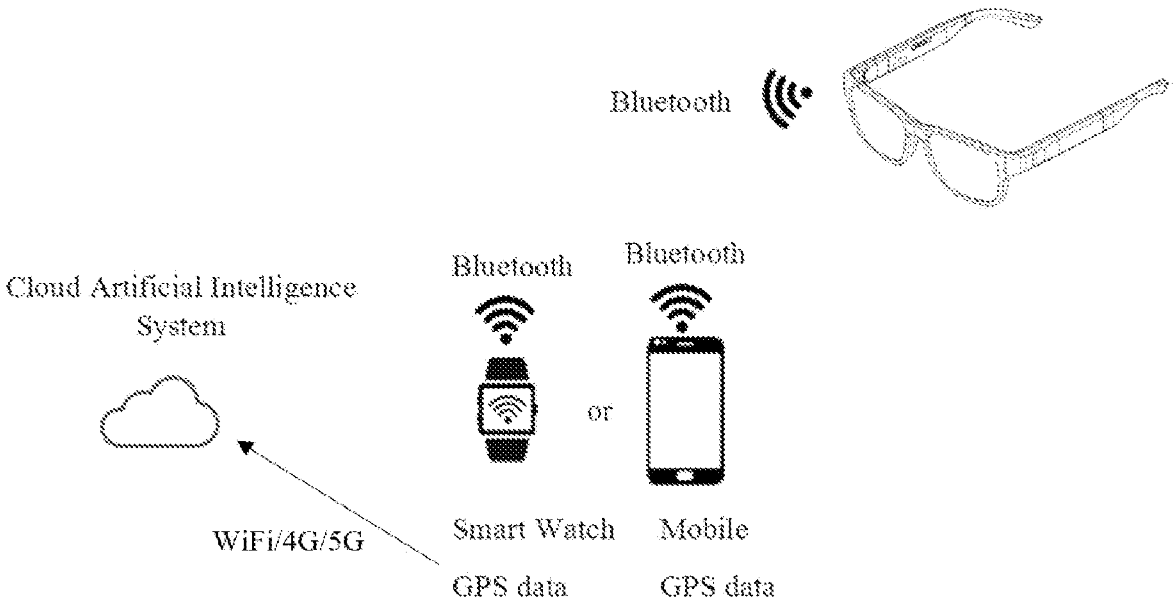
FIG. 3 is an architecture diagram of a smart glasses system including the smart glasses according to the present disclosure.
Figure 4A:
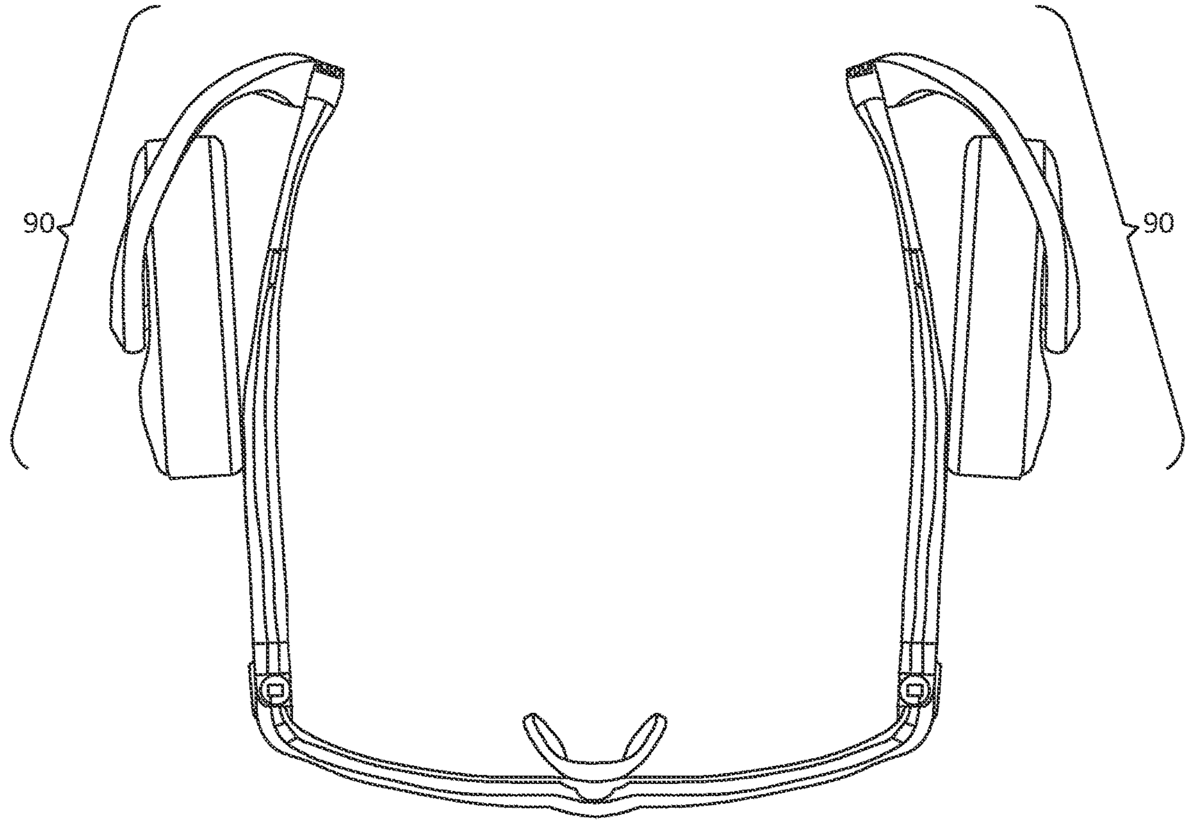
FIG. 4A is a top view of the smart glasses according to the present disclosure.
Figure 4B:
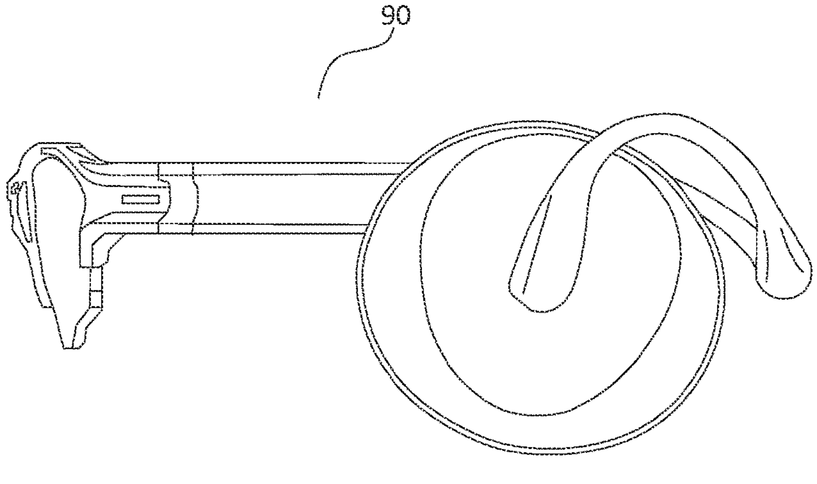
FIG. 4B is a view showing the assembly of a cover and a wearing part of the smart glasses according to the present disclosure.

Further, the wireless communication module 20 can be provided with a communication sub-module for communicating and interacting with other devices and modules in the smart glasses through wireless communication modes such as WIFI and Bluetooth, or with smart terminals and cloud system other than the smart glasses, forming a smart glasses system as shown in FIG. 3. The cloud system generally performs large-capacity data storage, big data analysis and transmission. The smart terminals are responsible for the interface control and communication between the smart glasses and the user, such as song selection and playback for listening to music, and volume control of the smart glasses.

Both the microphone 30 and the speaker 40 are connected to the MCU. The MCU is used to receive the audio signals (such as music, call voice, ambient noise, etc.) picked up by the microphone 30. The DSP is used to process the data sent by the MCU and return the same to the MCU after processing. The MCU is also used to control the volume of the speaker 40.

The microphone 30 is placed on the inner side of one of the temples 11 of the glasses body 10, located close to the front frame 12 relative to the tail end of the temple 11. In other words, the microphone 30 is positioned near the root of the temple 11, where the root of the temple 11 refers to the portion where the temple 11 and the front frame 12 are connected and is close to the wearer's mouth, which facilitates to pick up the wearer's voice. The quantity of the microphone 30 is not limited. Microphones 30 can be arranged on the same temple, or separately arranged on the two temples 11, which both fall within the protection scope of the present disclosure. Preferably, the quantity of microphones 30 is two. The first microphone 31 and the second microphone 32 can be arranged in up-and-down direction on the temple 11 as shown in FIG. 1, or can be arranged in left-and-right direction or in a diagonal direction.

The speakers 40 are placed on the inner sides of the two temples 11 of the glasses body 10, and located away from the front frame 12 relative to the tail ends of the temples 11. That is, the speakers 40 are placed closer to the tail ends of the temples 11 than the microphones 30, and thus closer to the wearer's ears, so as to allow the wearer to hear the output audio more clearly. Preferably, the quantity of speakers 40 is two. The first speaker 41 and the second speaker 42 can be respectively placed on the two temples 11 as shown in FIG. 1. Alternatively, the quantity of the speaker 40 can be one, placed at the tail end of one of the temples 11, or it can be more than one, and the speakers 40 are arranged in a preset arrangement on each temple 11, such as in up-and-down direction, left-and-right direction, diagonal direction or circular arrangement, etc. The quantity and arrangement of the speakers 40 are not limited, and all options fall within the protection scope of the present disclosure.

The touch sensor 50 is connected to the MCU, and the wearer can operate the touch sensor 50 through touch gestures of sliding left and right to increase or decrease the output volume.

The battery 60, the proximity sensor 70 and the nine-axis sensor 80 are all connected to the MCU. The battery 60 can be a rechargeable battery or a button battery to power various devices of the smart glasses. The proximity sensor 70 is used to detect whether the wearer wears the smart glasses on the face and whether the wearer wears the smart glasses correctly. The nine-axis sensor 80 is used to detect the wearer's motion status, which may include a three-dimensional acceleration transducer, a three-dimensional gyroscope, a three-dimensional magnetic sensor, etc.

Here, the speaker 40 has a sound outlet 401, and a cover 90 is provided on the wearing part such as the temple 11 or the tail sleeve 111. The cover 90 is used to cover the wearer's ear and the sound outlet 401 together. It should be noted that in the case where the speakers 40 include a first speaker 41 and a second speaker 42 and both the first speaker 41 and the second speaker 42 have the above-mentioned sound outlets 401, only one temple 11 or tail sleeve 111 may be provided with a cover 90, or both the left and right temples 11 or the two tail sleeves 111 may be each provided with a cover 90.

The cover 90 is preferably made of a material with good sound-insulating effect, so that the sound emitted from the sound outlet 401 can be kept within the cover 90 to the maximum extent, and external environmental noise cannot enter the cover 90, and thus most of the audio signals that the wearer can heard come from the sound outlet 401. Further, the inner wall of the cover 90 can be made of a material that is highly reflective to sound waves, such as plastic or light hard materials, so that the sound waves from the sound outlet 401 can enter the wearer's ear without being absorbed by the material of the cover 90.

It can be seen that after wearing the above-described smart glasses, as the sound outlet 401 of the speaker 40 and the wearer's ear are both covered in the cover 90, the cover 90 isolates the sound outlet of the speaker 401 and the wearer's ear from external environmental noise, changing the "open-ear" speaker 40 into a "closed-ear" speaker 40, which allows the wearer's ear to receive less external environmental noise and reduces the impact of external environmental noise on the volume of the smart glasses speaker 40 that the wearer can hear, and this "closed-ear" speaker 40 can also reduce sound leakage to a certain extent.

The detail structure of the cover 90 according to the present disclosure is described in detail below in two embodiments.

Embodiment 1

As shown in FIGS. 4A, 4B, 5A, 5B and 6, the cover 90 includes a connecting rod 9011, an audio reflector 9012, and an earmuff 9013. The connecting rod 9011 has a first end 9011*a* and a second end 9011*b*, and the first end 9011*a* is connected to the wearing part. The audio reflector 9012 has an inner side 9012*a* and an outer side 9012*b*, the outer side 9012*b* is connected to the second end 9011*b* of the connecting rod 9011, and the inner side 9012*a* is configured to reflect the sound waves from the sound outlet 401 to the wearer's ear. The earmuff 9013 is used to accommodate the wearer's ear and fixed on the inner side 9012*a* of the audio reflector 9012 so that the sound waves reflected by the inner side 9012*a* of the audio reflector 9012 can enter the ear in the earmuff 9013.

The audio reflector 9012 is configured to reflect the sound waves from the sound outlet 401 of the speaker 40 to the wearer's ear. Therefore, the reflection function of the audio reflector 9012 allows the reflected sound waves and the directional sound waves directly from the sound outlet 401 of the speaker 40 to be in the same phase, and the superposition of the two waves can enhance the intensity of the sound wave signals entering the wearer's ear to a certain extent.

Figure 5A:
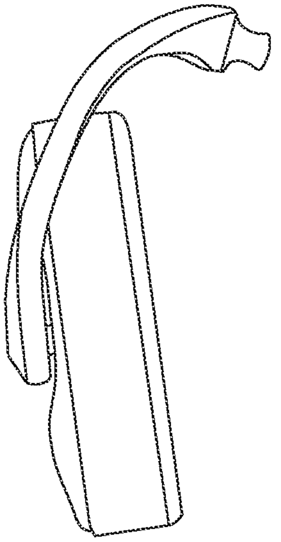
FIGS. 5A and 5B are views showing the cover installed on the left temple and the cover installed on the right temple respectively.
Figure 5B:
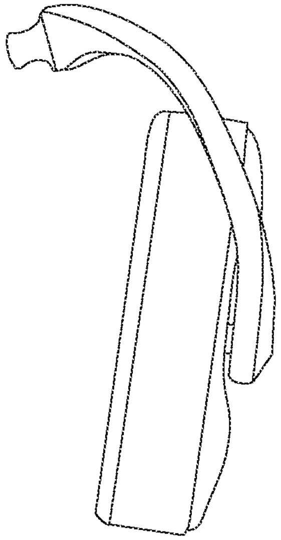
Figure 6:
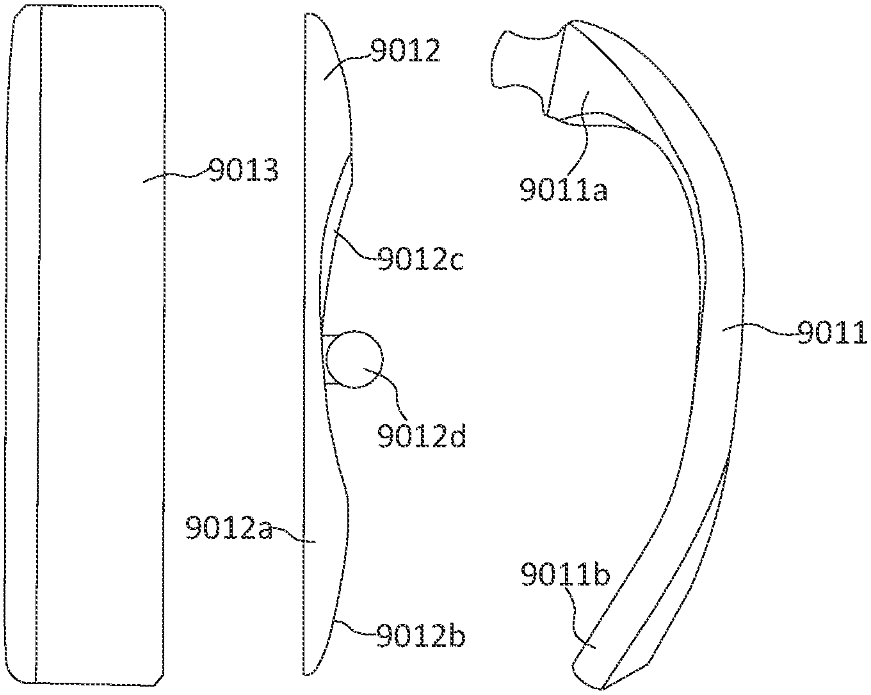
FIG. 6 shows the specific structure of the cover of the smart glasses according to an embodiment of the present disclosure.

Similarly, only one cover 90 can be equipped with an audio reflector 9012, or both covers 90 can each be equipped with an audio reflector 9012. FIGS. 5A and 5B show the cover installed on the left temple and the cover installed on the right temple respectively.

The audio reflector 9012 in the cover 90 can be designed in various ways. Generally, it can realize the audio reflection function inside the cover 90, so that the sound waves from the sound outlet 401 can be reflected to the wearer's ear.

Figure 7A:
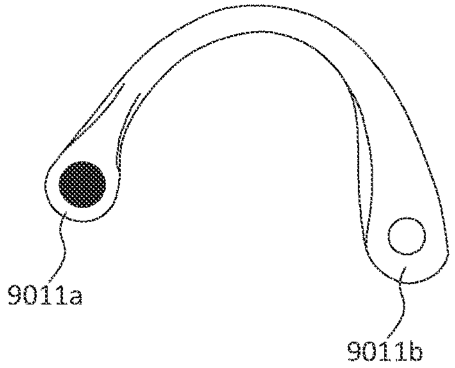
FIGS. 7A and 7B are schematic views of two sides of a connecting rod of the cover according to an embodiment of the present disclosure, respectively.
Figure 7B:
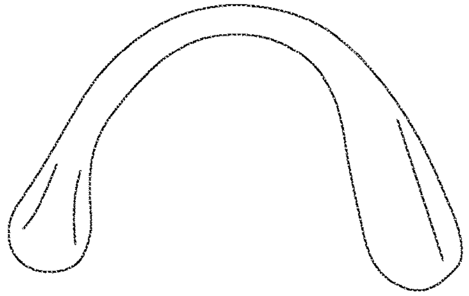
Figure 7C:
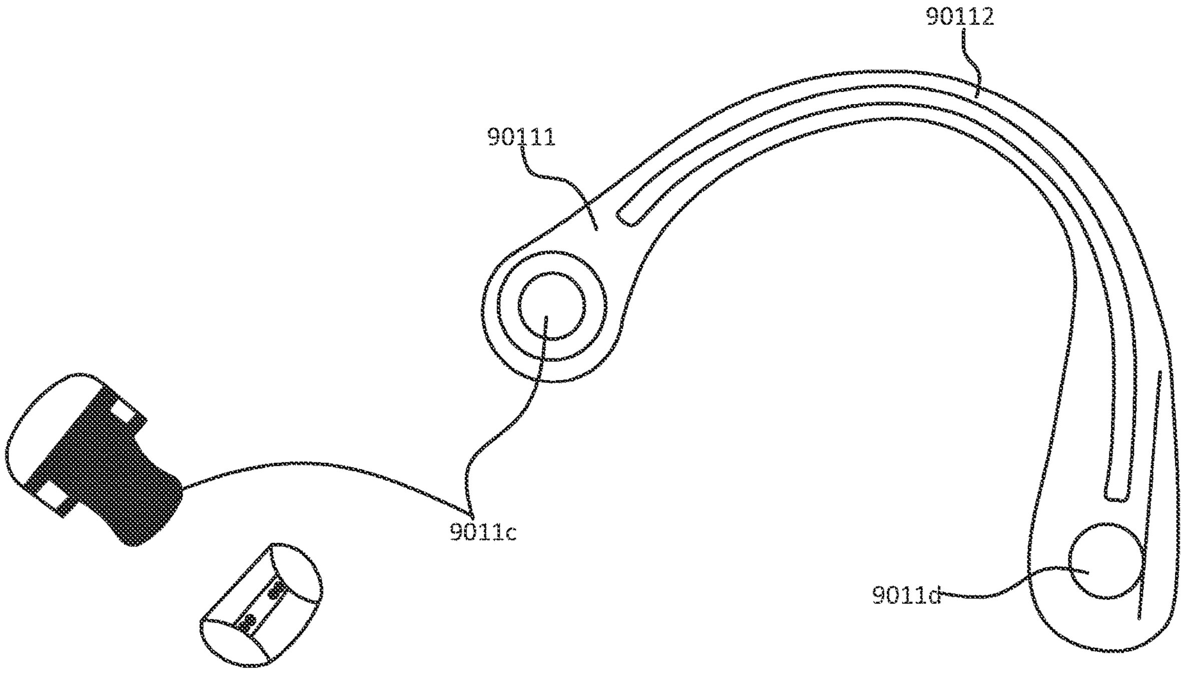
FIG. 7C is a cross-sectional view of the connecting rod of the cover according to an embodiment of the present disclosure.

Referring to FIGS. 7A, 7B, and 7C, the connecting rod 9011 includes a soft gel layer 90111 and a metal strip 90112 wrapped in the soft gel layer 90111. The soft gel layer 90111 can be made of silica gel with high hardness. The connecting rod 9011 is arc-shaped as a whole and bent toward the outside of the wearing part. Since the metal strip 90112 of the connecting rod 9011 is stretchable and bendable, the wearer can arbitrarily adjust the length or curvature of the connecting rod 9011 so that the earmuff 9013 can cover the ear completely or partially.

Figure 8:
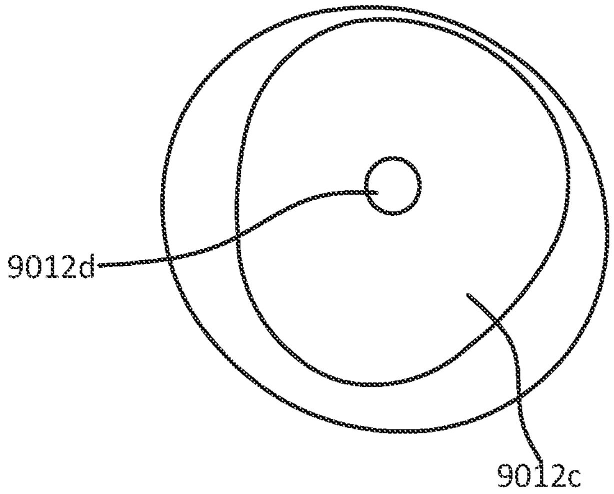
FIG. 8 shows the outside of an audio reflector of the cover according to an embodiment of the present disclosure.

It can be seen that the audio reflector 9012 mainly functions to fix the earmuff 9013 and to reflect the sound waves emitted from the sound outlet 401 in the cover 90. Therefore, the material of the audio reflector 9012 is generally made of plastic or light and hard materials which can reflect the sound waves. Here, the side where the audio reflector 9012 contacts the earmuff 9013 is defined as the inner side 9012*a*, and the side connected to the connecting rod 9011 is defined as the outer side 9012*b*. FIG. 8 shows the outer side 9012*b*, which shows that the middle area of the outer side 9012*b* has a recessed portion 9012*c*, and a ball 9012*d* protrudes outward from the center of the recessed portion 9012*c*.

Furthermore, in order to prevent external environmental noise from entering the cover 90 through the audio reflector 9012, a sound-absorbing material layer can be further attached to the outside of the audio reflector 9012. The sound-absorbing material layer can be made of cotton.

Referring to FIG. 6, FIG. 7A, FIG. 7B, FIG. 7C and FIG. 8, the first end 9011*a* of the connecting rod 9011 is provided with a rubber nail 9011*c*, and the second end 9011*b* has a round hole 9011*d*. The wearing part has a fixing hole. The rubber nail 9011*c* is fixed in the fixing hole so as to connect the connecting rod 9011 and the wearing part. The ball 9012*d* of the audio reflector 9012 is engaged in the round hole 9011*d* of the second end 9011*b* so as to connect the connecting rod 9011 and the audio reflector 9012.

Since the earmuff 9013 will be in direct contact with the wearer's ear, to ensure wearing comfort, it is generally made of foam or soft materials. Here, the earmuff 9013 can use the specific structure as follows.

Figure 9:
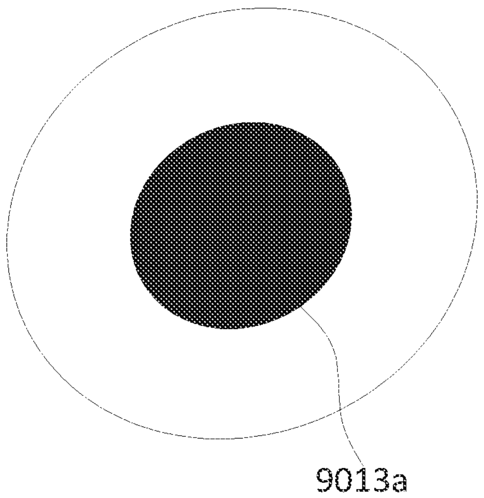
FIG. 9 shows an adhesive material attached on the bottom of an earmuff of the cover according to an embodiment of the present disclosure.
Figure 10:
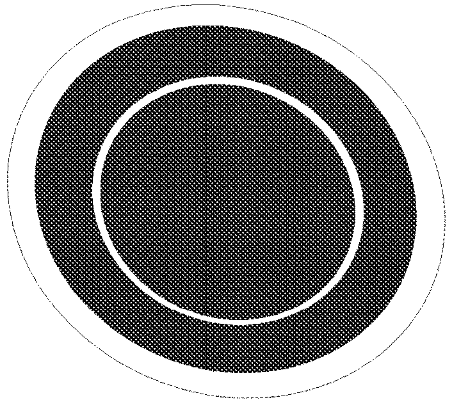
FIG. 10 is a schematic view showing the earmuff being fixed on the inside of the audio reflector shown in FIG. 8.
Figure 11:
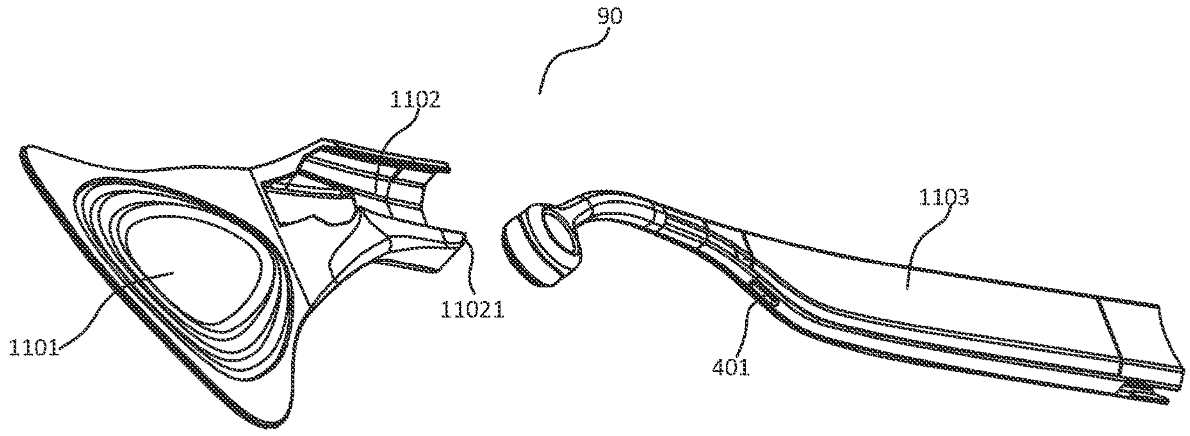
FIG. 11 is an exploded view of a cover and a wearing part according to a second embodiment of the present disclosure.
Figure 12:
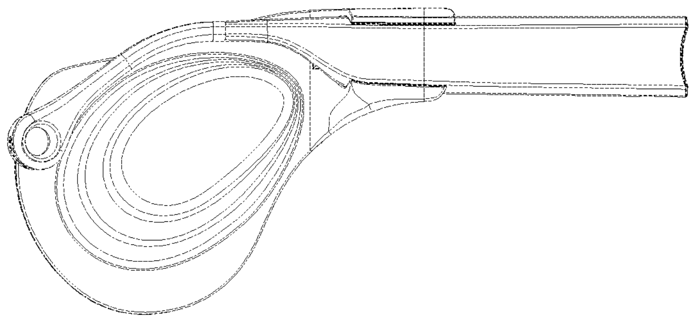
FIG. 12 is a schematic view of the cover and the wearing part after being assembled according to the second embodiment of the present disclosure, viewed from the inside toward the outside.
Figure 13:
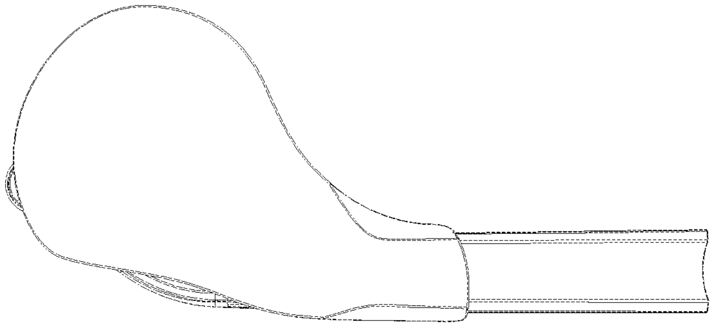
FIG. 13 is a schematic view of the cover and the wearing part after being assembled according to the second embodiment of the present disclosure, viewed from outside toward inside.
Figure 14:
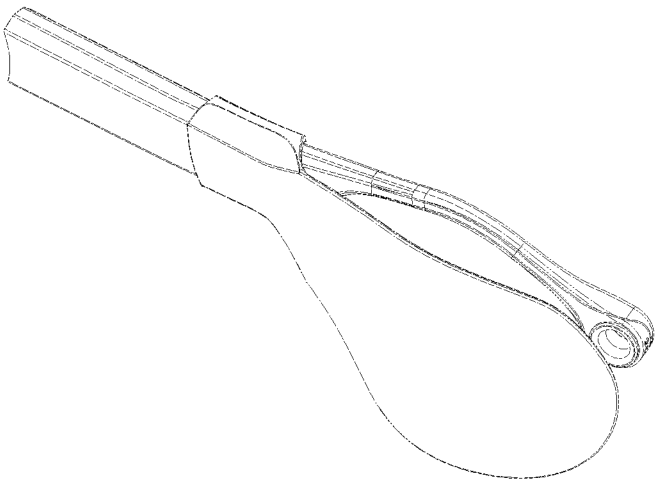
FIG. 14 is a perspective view of the cover and the wearing part after being assembled according to the second embodiment of the present disclosure.
Figure 15:
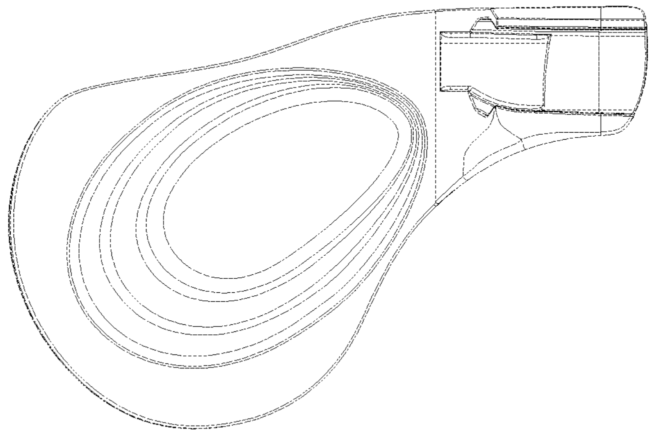
FIG. 15 is a schematic view of the cover according to the second embodiment of the present disclosure, viewed from the inside toward the outside.
Figure 16:
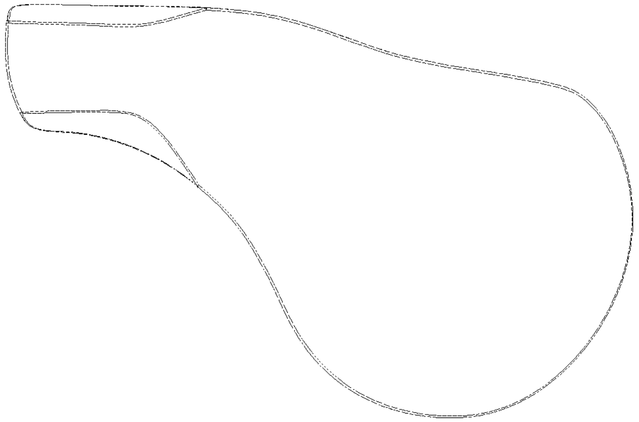
FIG. 16 is a schematic view of the cover according to the second embodiment of the present disclosure, viewed from outside toward inside.

The earmuff 9013 has a complete earmuff structure, including a bottom and an annular portion perpendicularly connected to the periphery of the bottom. The bottom and the annular portion define a chamber for accommodating the ear, where the annular portion is used to cover the wearer's ear, and the bottom is fixedly connected or detachably connected on the inside of the audio reflector 9012. The detachable connection is provided considering that the ears of different wearers are different in size and thus the earmuffs should have different sizes. Therefore, the bottom can be attached on the bottom of the earmuff 9013 through double-sided tape or Velcro as shown in FIG. 9, and fixed on the inside of the audio reflector 9012 through double-sided tape or Velcro as shown in FIG. 10 after fixation. The wearer can change the earmuff to match the size of his/her ear for increased comfort.

Embodiment 2

As shown in FIGS. 11 to 16, the cover 90 includes an earmuff 1101 and a groove 1102 connected to the earmuff 1101. The earmuff 1101 is used to accommodate the wearer's ear. Similar to Embodiment 1, the cover 90 also includes the audio reflector, the audio reflector is located in the earmuff and the earmuff 1101 can cover the ear completely or partially.

The wearing part is provided with an engaging portion 1103, and the engaging portion 1103 matches the groove 1102 in shape, so that the engaging portion 1103 can be engaged in the groove 1102. The sound outlet 401 of the speaker is provided on the wearing part, and when the engaging portion 1103 is engaged in the groove 1102, the sound outlet 401 of the speaker will also be located inside the cover 90.

Furthermore, the opening of the groove 1102 has a flange 11021, and the flange 11021 can prevent the engaging portion 1103 from falling off the groove 1102.

Further, a limiting structure can be provided on at least one of the two ends of the engaging portion 1103. The limiting structure is configured to restrict the sliding movement of the groove 1102 along the length of the wearing part. For example, the wearing parts of some smart glasses may have thinner portions near the ear. To ensure an optimal user experience by preventing the groove 1102 from sliding towards the thinner portion, a limiting structure can be placed at the end of the engaging portion 1103 near the thinner portion to prevent the sliding. The limiting structure can be a limiting protrusion or a limiting step, among other possibilities, and is not specifically limited here.

Embodiment 3

The difference between this embodiment and the second embodiment is that the cover 90 primarily consists of the earmuff 1101, which is integrated with the wearing part in one piece. This integration eliminates the need for the wearer to assemble and disassemble the cover 90. Also, the earmuff 1101 can cover the ear completely or partially The one-piece structure according to the third embodiment is mainly suitable for occasions where noise occurs frequently, so that the wearer does not need to repeatedly disassemble and assemble the cover 90. The above-mentioned second embodiment can allow the wearer to determine whether to assemble the cover 90 in different occasions (for example, it is suitable for occasions with frequent noise as well as those with occasional noise).

The above are only preferred embodiments of the present disclosure and are not intended to limit the present disclosure. Any modifications, equivalent replacements and developments made within the spirit and principles of the present disclosure shall fall within the protection scope of the present disclosure.

The invention claimed is:

1. Smart glasses with sound enhancement function, comprising a wearing part and a speaker, the speaker having a sound outlet, and the wearing part being provided with a cover for covering a wearer's ear and the sound outlet together;

wherein the cover is provided with an audio reflector therein; and wherein the cover comprises:

a connecting rod having a first end and a second end, the first end being connected to the wearing part;

the audio reflector having an inner side and an outer side, the outer side being connected to the second end of the connecting rod, and the inner side being configured to reflect sound waves from the sound outlet to the wearer's ear; and an earmuff for accommodating the ear and being fixed on the inner side of the audio reflector so that the sound waves reflected by the inner side of the audio reflector enters the ear in the earmuff.

2. The smart glasses with sound enhancement function of claim 1, wherein the connecting rod comprises a soft gel layer and a metal strip wrapped in the soft gel layer.

3. The smart glasses with sound enhancement function of claim 2, wherein the connecting rod is arc-shaped as a whole and bent toward an outer side of the wearing part.

4. The smart glasses with sound enhancement function of claim 1, wherein the outer side of the audio reflector is provided with a layer of sound-absorbing material.

5. The smart glasses with sound enhancement function of claim 1, wherein the first end of the connecting rod is provided with a rubber nail and the second end is provided with a round hole;

the wearing part has a fixing hole, and the rubber nail is fixed in the fixing hole so as to connect the connecting rod and the wearing part; and the audio reflector has a recessed portion in a middle area of the outer side thereof, the recessed portion is provided with a ball protruding outwardly, and the ball is engaged in the round hole so as to connect the connecting rod and the audio reflector.

6. The smart glasses with sound enhancement function of claim 1, wherein the earmuff comprises a bottom and an annular portion perpendicularly connected to a periphery of the bottom, and the bottom and the annular portion define a chamber for accommodating the ear; and the bottom is fixedly connected or detachably connected to the inner side of the audio reflector.

7. The smart glasses with sound enhancement function of claim 1, wherein the earmuff is configured to cover the ear completely or partially.

8. The smart glasses with sound enhancement function of claim 1, wherein the cover comprises an earmuff and a groove connected to the earmuff; and the wearing part is provided with an engaging portion, and the engaging portion is engaged in the groove.

9. The smart glasses with sound enhancement function of claim 8, wherein an opening of the groove has a flange, and the flange is configured to prevent the engaging portion from falling off the groove.

10. The smart glasses with sound enhancement function of claim 8, wherein the engaging portion has two ends, at least one end of which is provided with a limiting structure, and the limiting structure is configured to limit sliding of the groove along a length direction of the wearing part.

11. The smart glasses with sound enhancement function of claim 8, wherein the earmuff is configured to cover the ear completely or partially.

12. The smart glasses with sound enhancement function of claim 1, wherein the cover comprises an earmuff, and the earmuff and the wearing part are formed in one piece.

13. The smart glasses with sound enhancement function of claim 12, wherein the earmuff is configured to cover the ear completely or partially.

14. The smart glasses with sound enhancement function of claim 1, wherein the wearing part is a temple or a tail sleeve.

* * * * *